March 31, 1970  A. H. KINGBERG  3,503,292
SHEET CUTTING DEVICE
Filed Feb. 19, 1968  4 Sheets-Sheet 1
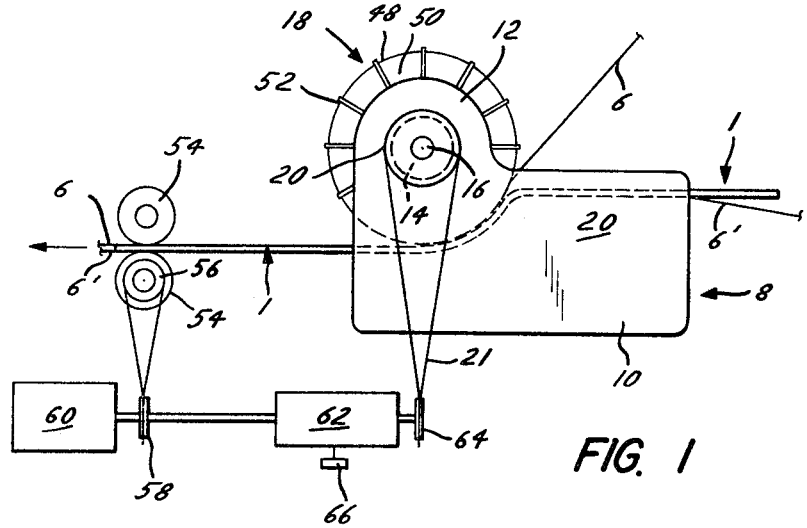
FIG. 1
FIG. 2
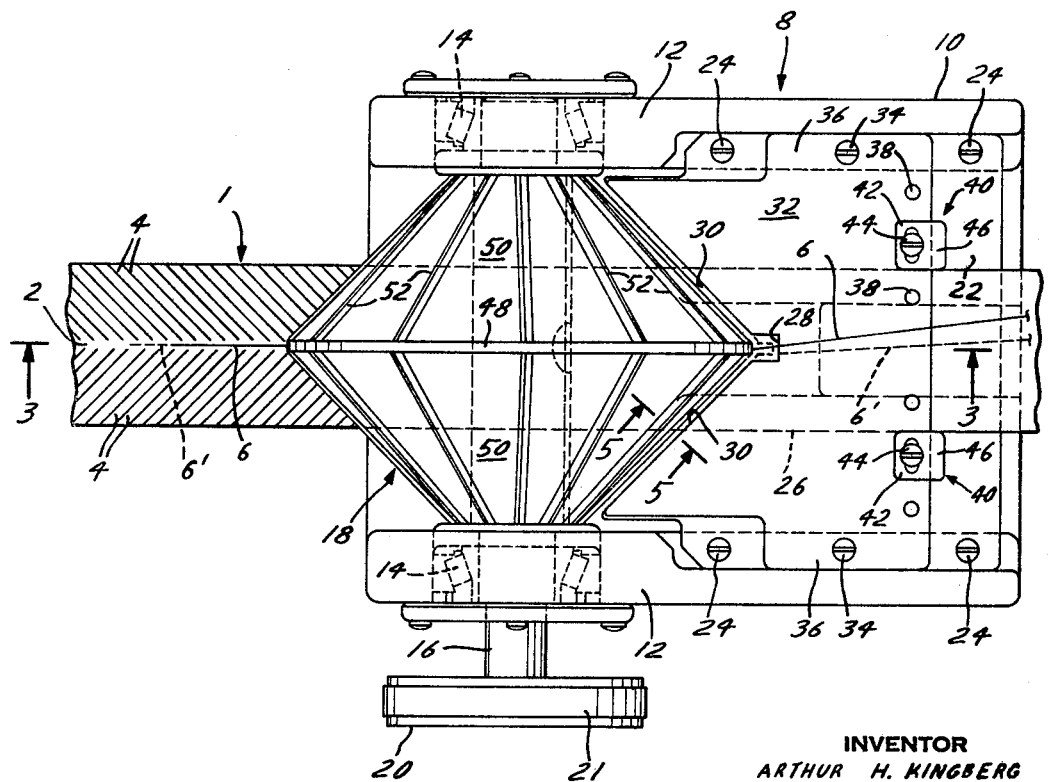
INVENTOR
ARTHUR H. KINGBERG
BY
ATTORNEY March 31, 1970 A. H. KINGBERG 3,503,292
SHEET CUTTING DEVICE Filed Feb. 19, 1968 4 Sheets-Sheet 2

INVENTOR
ARTHUR H. KINGBERG
BY
ATTORNEY

March 31, 1970   A. H. KINGBERG   3,503,292
SHEET CUTTING DEVICE
Filed Feb. 19, 1968   4 Sheets-Sheet 3

INVENTOR
ARTHUR H. KINGBERG
BY James and Franklin
ATTORNEY

March 31, 1970      A. H. KINGBERG      3,503,292

SHEET CUTTING DEVICE

Filed Feb. 19, 1968      4 Sheets-Sheet 4

INVENTOR
ARTHUR H. KINGBERG
BY
*James Franklin*
ATTORNEY

United States Patent Office 3,503,292
Patented Mar. 31, 1970

3,503,292
SHEET CUTTING DEVICE
Arthur H. Kingberg, Norwalk, Conn., assignor to Paper Novelty Manufacturing Company, Hartford, Conn., a corporation of New York
Filed Feb. 19, 1968, Ser. No. 706,340
Int. Cl. B26d 5/20
U.S. Cl. 83—355                        26 Claims

ABSTRACT OF THE DISCLOSURE

A device for cutting sheet material to produce a spaced series of cuts on side portions of the sheet at a desired angle relative to the sheet axis while maintaining the longitudinal continuity of the sheet, thereby to produce cut sheet material suitable for fabrication into garlands, imitation tree limbs and the like. The cutter comprises a stationary body on which the sheet material is adapted to move, that body terminating in an edge shaped to correspond to the desired angularity of the cuts to be produced and, in cooperation therewith, a rotary cutter which carries cutting members oriented in directions corresponding to said edge of the stationary body. The cutter as it is rotated causes the cutting members to move past said edge so as to cut the sheet therebetween. Longitudinal continuity of the sheet is produced by providing the cutter with a circumferential space free of cutting members, that space cooperating with a corresponding section of the edge on the stationary body.

The present invention relates to a device for producing a series of spaced cuts in longitudinally extending sheet material without destroying the longitudinal continuity of the sheet material, and in particular to providing those spaced cuts at a desired angular inclination relative to the longitudinal axis of the sheet material. The thus cut sheet material is suitable for many uses, among which may be mentioned the formation of garlands and artificial tree limbs simulating evergreens and hence suitable for use in forming artificial Christmas trees.

Strips of the type under discussion are cut while flat so as to define lateral fingers or "needles" of appropriate width extending out in a generally lateral direction from a central uncut portion of the strip. Filaments such as wires are placed axially along the central strip portion, and the strip and those filaments are thereafter twisted about the strip axis, thereby to produce the desired end product, which has the "needles" extending out therefrom in substantially all radial directions. The twisting action causes the orientation of the needles to change to a certain degree, relative to the longitudinal axis of the end product. Thus, if the needles are to project out at right angles to the axis of the finished product, they must initially be formed so as to diverge slightly from perpendicularity to the axis. If an end product is desired where the needles make a fairly sharp angle with the longitudinal axis, it is necessary that they be initially formed so as to depart markedly from a perpendicular position relative to the axis of the flat strip.

End products of the type under discussion must be formed rapidly and at low cost. It is also important that the needles distributed along the axis of the product be as identical to one another as possible. It is also highly desirable that the apparatus used for producing these products be capable of continuous use over long periods of time, and that such maintenance as is required be capable of being accomplished rapidly to maximize the productivity of a given machine.

Machines have been known and used for the production of products of the type under discussion, but they have suffered from some significant disadvantages. They fall into two general categories. In one type of machine, the strip to be cut is fed intermittently through the machine, there to be acted upon by a reciprocating cutter. This type of equipment is limited in productivity because of the intermittent feed, is relatively expensive because of the complicated feeding and cutter-actuating mechanism required and because the equipment must be relatively massive in order to withstand the operating shocks inherent in intermittent operation, and is further undesirable because of the difficulty encountered in producing cut needles of reliably uniform width. In the other type of machine, the sheet is fed between a pair of rollers at least one of which is provided with sharp cutting elements, the other roller acting to force the strip against the cutting elements to produce a pressure cutting effect. This type of machine has the advantage of continuous operation, but because a very significant amount of pressure must be developed between the two rollers, the mounting structure for those rollers must be relatively massive and this involves an appreciable item of cost. Even more significantly, since the cutting action is determined by the pressure between the rollers, and since there are practical mechanical limitations on how high that pressure can be, this type of equipment can be used as a practical matter only with relatively thin sheet material. A further significant drawback is that the width of the needles is determined by the circumferential spacing between the cutting elements on the roll, which cutting elements must of necessity have a sharp edge so as to function as a cutter. As a consequence, the actual design of these rollers is quite critical so that they are exceedingly expensive to manufacture.

The roller-carried cutting elements must have sharp edges. Sharp edges tend to become dull with use, and the greater the pressure to which a cutting element is subjected, the more rapidly will it become dull. Hence in these machines, the rollers must be withdrawn from the machine quite frequently for resharpening. Moreover, the resharpening operation is an exceedingly difficut and time-consuming one because of the nature of the cutting roller and the large number of very closely spaced roller-carried cutting edges which must be sharpened.

The continuously operating pressure-cutting machine can produce, with a given cutting roller, needles of only a given width and angularity determined by the roller design. Moreover, it is apparently inherent in the structure involved that the angularity can only depart from perpendicularity with the longitudinal axis of the strip to a very limited degree. The intermittent feed type of machine can be used to produce needles of different width by modifying the feed of the strip as it passes through the machine and the cutters thereon can be set over a relatively wide range to produce needles of desired angularity relative to the longitudinal axis of the strip, but when the cutting elements are once set for a given needle angularity, it is a matter of major readjustment to modify that setting.

It will be appreciated that the cut strip desirably has the following characteristics: the cuts between adjacent needles are all at the same angle to the longitudinal axis of the strip and they all extend completely from the side edge of the strip to substantially the same point inwardly of the width of the strip; the axial spacing between the cuts, and hence the width of the needles, is uniform. The device which does the cutting, in addition to producing a thus-characterized cut strip, has the following characteristics: the cuts are made rapidly so that long lengths of cut strip are produced in each time unit of the operation of the machine; within limits, variations in needle width and/or orientation can be made without major modification or readjustment of the machine; the machine is inexpensive, reliable in operation and easily maintained in proper operating condition, including maintaining the cutting elements at a requisite degree of sharpness.

It is the prime object of the present invention to devise a machine for cutting longitudinally elongated sheets which avoids the disadvantages of both of the general types of machines previously used for a similar purpose, but which instead has the characteristics set forth in the preceding paragraph. More specifically, the cutting device of the present invention is of extreme simplicity and hence is quite inexpensive, yet it is capable of a much higher rate of productivity than the machines previously used for the same purpose, and may be maintained much more readily, quickly and inexpensively. A given machine can be readily adjusted and/or modified so as to vary the thickness of the needles produced and/or their angularity, within limits. The parts which carry the sharp cutting edges are readily removable and replaceable for sharpening purposes, and are so constructed as to be easily and quickly sharpened.

In accordance with the present invention the cutting action is effected by causing the sheet to move over an appropriately shaped edge of a supporting body, there to be acted upon by cutting elements carried by a rotatably mounted and driven cutter. The members carried by the cutter preferably function as anvils, and hence need not be cutter-sharp. The actual cutting edge is constituted by the body edge over which the sheet moves; it is only that body edge which need be sharp, and since that body can be defined by a simple removable plate it is very readily maintained in desired condition of sharpness. The cutting members on the rotatable cutter, on the other hand, require only very limited and infrequent maintenance.

The end edge of the support may be shaped either concavely or convexly to correspond to the desired angularity and/or shape of the cuts to be produced and hence of the needles to be formed, and the cutting members on the rotatable cutter are matingly oriented and configured. Thus the cutting device of the present invention can be used to produce cuts of a wide variety of shapes and extending over a wide range of angularity relative to the longitudinal axis of the strip being cut.

Because the cutting members on the rotatable cutter and the edge on the support body function as anvil and cutting edge respectively, no great degree of pressure need be exerted by one or the other of the cutter and supporting body, and as a result the supporting structure need not be excessively sturdy. Despite this fact, effective cutting action can be produced on sheets having a thickness many times that of the maximum thickness previously used with machines of the opposed roller type; indeed, with the device of the present invention several plies of sheet material can be cut simultaneously, thus increasing the machine output severalfold over that which was previously thought possible.

The cutting device of the present invention is capable of performing its cutting action while at the same time incorporating the axially extending wires or filaments with the strip, thereby to produce an assembly which, when it leaves the machine, need only be twisted in order to form the desired end product. This is a very advantageous capability of the machine of the present invention, but it will be understood that the machine can also be used merely to cut the sheets, with the axially extending wires being operatively associated therewith at some later point in the production line. Indeed, when the device of the present invention is used to operate simultaneously on a plurality of plies of sheet material, it is most likely that those plies, after being cut, would subsequently be separated and then individually associated each with its own axially extending filaments.

In accordance with the above, and to such other objects as may hereinafter appear, the present invention relates to the construction of a sheet cutting device as defined in the appended claims and as described in this specification, taken together with the accompanying drawings, in which:

FIG. 1 is a side elevational view of one embodiment of the present invention, the sheet feed and cutter-drive mechanisms being shown semi-schematically;

FIG. 2 is a top plan view on an enlarged scale of the device of FIG. 1;

Figure 3:
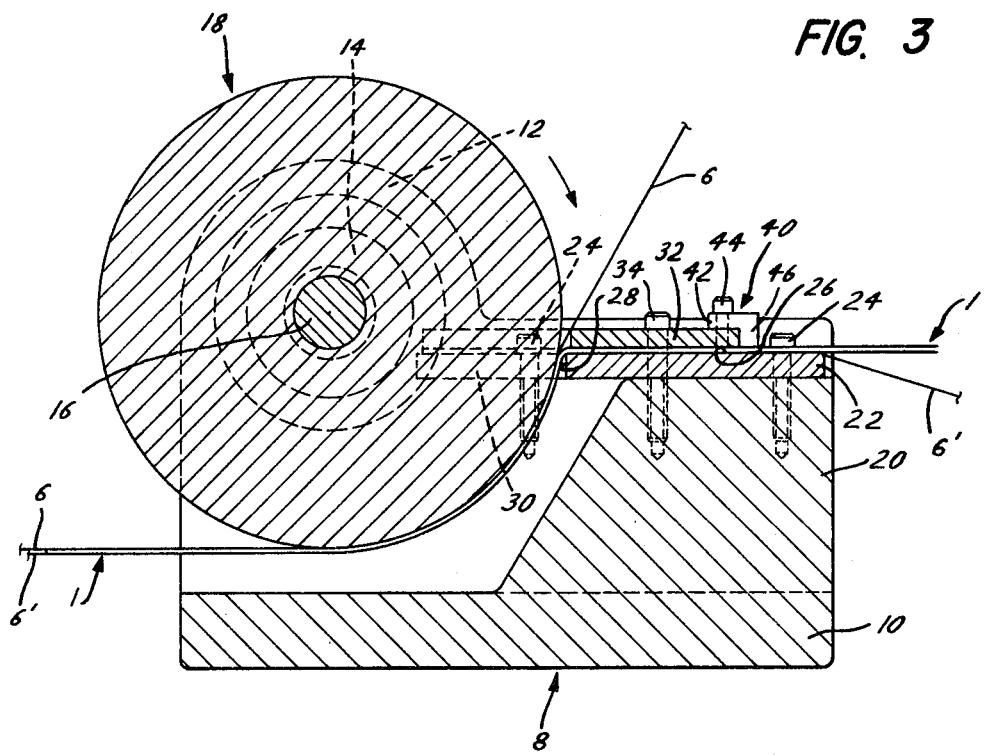
FIG. 3 is a cross sectional view taken along the line 3—3 of FIG. 2.

The cutting device embodiment of FIGS. 1–5 is designed to produce a strip generally designated 1 having a central longitudinally extending portion 2 from which a large number of thin needles 4 extend out laterally to each side, the needles in the illustrated embodiment being inclined forwardly so as to make an acute angle with the longitudinal axis of the strip. The strip is adapted to have wires or other filaments 6 and 6' disposed above and below the central longitudinally extending portion 2, after which the assembly is twisted about its longitudinal axis, with the wires 6 and 6' giving the product longitudinal and torsional rigidity, thereby to produce a garland or artificial tree branch. When the needles 4 are sharply angled forward to a degree such as that shown in FIG. 6, when the end product is thus twisted the needles 4 will extend out from the longitudinal axis of the finished product in a forwardly inclined position (although somewhat less forwardly inclined than when the strip is in its flat condition shown in FIG. 6), the needles 4 likewise extending out more or less at random completely circumferentially around the longitudinal axis, thereby accurately to simulate the branches of certain types of evergreen trees. The sheet material from which the cut strip is formed may be of a wide variety of materials, for example, appropriate plastics, thin metal, or paper.

The cutting device of the present invention comprises a supporting framework generally designated 8 comprising a frame 10 having ears 12 extending up therefrom at one end, those ears carrying bearings 14 within which shaft 16 is journaled. Mounted on the shaft 16 is a rotatable cutter generally designated 18. The shaft 16 is adapted to be driven in any appropriate manner, as by means of the pulley 20 and belt or sprocket chain 21 so as to cause the cutter 18 to rotate.

The frame 10, forwardly (to the right) of the cutter 18, is provided with an upstanding supporting portion 20 on which a base plate 22 is mounted, as by means of the screws 24. The base plate 22 has an upper surface 26 over which the strip 1 is adapted to move and it terminates at its left hand end in an end edge comprising an intermediate edge section 28 of width preferably corresponding to that of the control strip portion 2 and outer edge sections 30 extending out relative to opposite end of the intermediate edge section 28 and making a given angle with one another. In the embodiment here disclosed the angularity of the outer sections 30 relative to one another corresponds to the desired angularity of the needles 4 in the strip shown in FIG. 6, the edge sections 28, 30, 30 thus defining a concave configuration. Preferable, as may best be seen from FIG. 2, the intermediate edge section 28 is recessed relative to the adjacent ends of the outer section 30.

Mounted above the base plate 22 by a distance generally corresponding to the desired thickness of the strip or strips 1 adapted to be passed through the device is a stripper plate 32, held in place by screws 34. The stripper plate 32 is provided at its sides, which extend beyond the sides of the base plate 22, with depending flange portions 36 which engage the upper surface of the support 20 and thus produce the desired vertical spacing between the plates 22 and 32. This spacing can, of course, be adjusted to any desired value by interposing shims or other spacers between the support 20 and the flange portions 36. The left hand edge of the stripper plate 32 preferably substantially corresponds in configuration and location to the edge sections 28 and 30 of the base plate 22, although the stripper plate 32 may terminate at its left hand end slightly short of the corresponding edges of the base plate 22.

The right hand end of the stripper plate 32 is provided with a plurality of laterally spaced apertures 38. Side guides 40 for the strip 1 are provided, each having a top portion 42 and a downwardly extending portion 46. The top portion 42 is adapted to extend over the upper surface of the stripper plate 32 and to be secured thereto by screws 44 passing through selected apertures 38. The downwardly extending portions 46 are located in advance (to the right) of the right hand edge of the plate 32 and extending down across the opening into the space between the plates 22 and 32, thereby to define lateral guides for the strip 1 as it moves between the plates 22 and 32.

The rotary cutter 18, in the form shown in the embodiment of FIGS. 1–5, comprises a drum having a central section 48 and outer sections 50 which are axially outwardly and radially inwardly oriented so as to define a convex configuration. Mounted on the outer drum sections 50 are cutting members 52, those cutting members extending substantially radially out from the drum sections 50 and, in the form shown when aligned pairs of cuts are to be formed in the strip 1, being arranged in aligned pairs of members which are circumferentially spaced from one another and which, as here specifically disclosed, may be appreciably thus spaced by distances much greater than the spacing between the cuts to be made. The projecting edges of these cutting members 52 are angularly related to one another in substantially the same fashion as the outer edge sections 30 of the base plate 22 are related to one another, the outer edge sections 30 together with the intermediate edge section 28 defining a shape which substantially mates with that defined by the edges of the cutting members 52 and the central section 48 of the rotary cutter 18. The cutter 18 is so mounted on the apparatus that as it rotates the edges of the cutting members 52 sweep closely past the edge sections 30 on the stationary base plate 22. As a result anything then interposed between those edges is severed. An appreciable clearance is provided between the outer edge of the central drum section 48 and the intermediate edge section 28 of the plate 22, so that no cutting or severing action occurs there as the cutter 18 is rotated. The stationary edge sections 30 or, more properly, the upper corners of those edge sections, are made sharp and define the actual cutting edges. The operative portions of the cutting members 52, that is to say, the radially outer corners of the leading edges thereof, function as anvils and need not be cutter-sharp. In order to facilitate the cutting operation by providing a progressive cut, the cutting elements 52 are preferably skewed on the outer surface of the drum section 50 so that a cut is produced starting at one end (such as the outer end) and moving to the other end as the cutter 18 rotates and sweeps the cutting members 52 past the stationary outer edge sections 30.

Any suitable means may be provided for feeding the strip 1 through the machine. In the example disclosed in more or less schematic form, such a feeding means is constituted by a pair of feed rollers 54 between which the leading end of the strip 1 is passed, those rollers engaging the strip and pulling it through the machine. The rollers 54 may be driven by belt or sprocket wheel 56 via sprocket or pulley 58 rotated by motor 60, the motor 60 also, through reduction gearing 62, rotating sprocket or pulley 64 which engages the chain or belt 21 which drives the rotary cutter 18.

In use the strip 1 to be cut will be threaded through the machine so as to pass vertically between the plates 22 and 32 and laterally between the lateral guides 40, over the edge sections 28 and 30, and down beneath the cutter 18 to the feeding means 54. When the machine is driven the feeding means 54 will pull the strip 1 over the end edge of the plate 22 and will at the same time rotate the cutter 18. As the cutter 18 rotates the sets of cutting members 52 will sequentially be moved closely past the stationary outer edge sections 30, thereby cutting that particular portion of the strip 1 which is then there located, as may be seen from FIG. 5. This cut will be accomplished in a shearing fashion, with one of the cooperating edges functioning as a cutting edge and the other functioning as an anvil. It is preferred that the sharp cutting edge be provided on the plate 22, since that plate may readily be removed from the machine and very easily resharpened, wheras it would be a very time consuming operation to attempt to sharpen the operative edges of the cutting elements 52 on the rotary cutter 18.

A significant aspect of the machine of the present invention is that the spacing between the cuts on the strip, that is to say, the thickness of the needles 4, does not require that the sets of cutting elements 52 on the cutter 18 be correspondingly circumferntially spaced. The thickness of the needles 4 is determined not only by the circumferential spacing of the cutting members 52 on the cutter 18 but also by the relative speeds of movement of the cutter 18 and the strip 1. As a result cutters 18 can be made with only a limited number of sets of cutting members 52 which are relatively widely circumferentially spaced from one another, as here disclosed, thus significantly reducing the cost of such cutting members 18, but very thin needles 4 may still be produced by causing the cutter 18 to be rotated rapidly relative to the speed of travel of the sheet 1. Indeed, one can with a given cutting member 18 produce needles 4 of different widths, within limits, or even needles 4 of varying widths during a cutting run, merely by modifying the relative speed of movement of the cutter 18 and the strip 1. This may readily be done, as indicated schematically in FIG. 1, by providing a manual adjustment 66 on the gear box 62, thereby to vary the speed of rotation of the cutter 18 relative to the speed of movement of the feeding means 54 and hence of the strip 1. It will be understood, of course, that the significant factor here is a change in the relative speed of movement of the two parts, and that either or both can be adjusted relative to the other to produce that variation in relative speed.

The angularity of the cuts between the needles 4 and hence the angularity of the needles thus produced is more or less fixed by the angularity of the outer edge sections 30 and the cutting members 52. However, with a given set of outer edge sections 30 and cutting members 52, some variation in the angularity of the cuts can be produced by shifting the location of the outer edge sections 30 up and down along the spherical surface swept by the edges of the cutting members 52. This type of adjustment can either be built into the equipment or can be accomplished by providing appropriately shaped shims or other spacers between the plate 22 and part 20 and providing for some degree of lateral movement of the plate 22 relative to the part 20, as by providing oversized holes through which the screws 24 pass.

Figure 6:
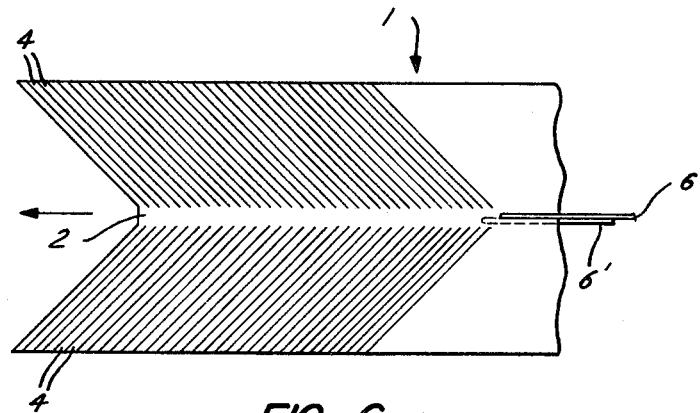
FIG. 6 is a top plan schematic view of a strip used in conjunction with the embodiment of FIGS. 1–5 and showing at the right hand portion the strip before it is cut and at the left hand portion the strip after it is cut.
Figure 7:
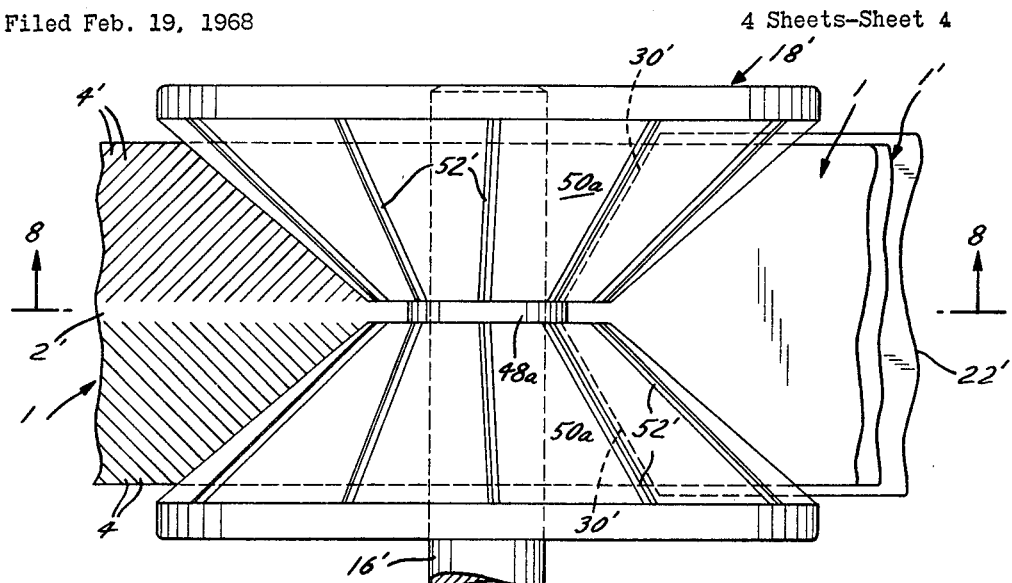
FIG. 7 is a top plan view similar to FIG. 2 but showing a second embodiment of the present invention.
Figure 8:
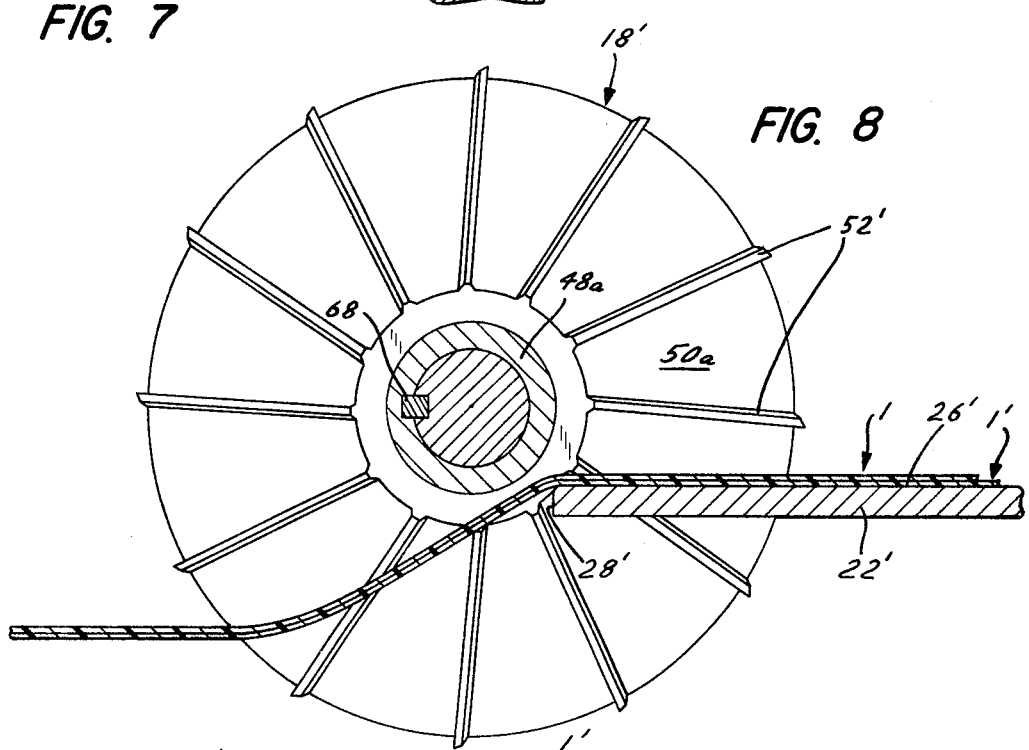
FIG. 8 is a cross sectional view taken along the line 8—8 of FIG. 7.
Figure 9:
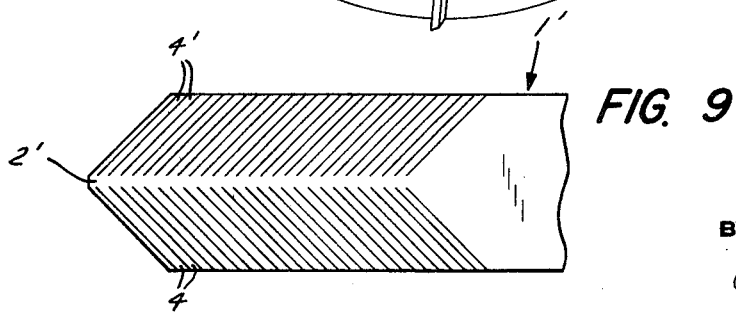
FIG. 9 is a top plan schematic view similar to FIG. 6 but of the strip formed by the embodiment of FIGS. 7 and 8.

The embodiment of FIGS. 7 and 8 is similar to that of FIGS. 1–5, and similar reference numerals are applied thereto, distinguished, however, by being primed. The embodiment of FIGS. 7 and 8 is, however, designed to produce cuts which are oppositely oriented from that of the embodiment of FIGS. 1–5, as may best be seen from FIG. 9, the cuts there being inclined outwardly and to the right instead of outwardly and to the left as shown in FIG. 6. Hence the outer stationary edge sections 30' for the base plate 22' extend outwardly and to the right to define, along with the intermediate edge section 28', a substantially convex configuration, while the rotary cutter 18 has a central section 48' and outer sections 50' which define a substantially concave configuration. The cutting members 52' carried by the drum sections 50' have outer operative edges which cooperate both spatially and functionally with the stationary edge sections 30' in the same manner as the correspondingly numbered parts in the embodiment of FIGS. 1–5.

The convex cutter of the embodiment of FIGS. 1–5 can be made in a plurality of pieces assembled together, but it can also be conveniently made in a single piece, since the shape is such that it can readily be formed on conventional machine tool equipment. The concave cutter of the embodiment of FIGS. 7 and 8, however, is considerably more difficult to manufacture in one piece. It therefore is preferably formed of a central ring 48a and outer sections 50a all made fast to the shaft 16' by means of a key 68.

The embodiment of FIGS. 7 and 8 is illustrated as being used to simultaneously cut a pair of superposed sheets 1 and 1'. This is to illustrate the capability of the device of the present invention to cut thick sheets or plural plies making up a composite thick sheet. The embodiment of FIGS. 1–5 has precisely the same capability, and the fact that it is illustrated as acting only on a single sheet thickness is merely a matter of exemplary illustration and is not a limiting factor. While rotary cutting machines of the double-roller type cannot, as a practical matter, operate on sheets more than 2 or 3 mils in thickness, the apparatus of the present invention can operate effectively on sheets 15 mils in thickness or on on two superposed sheets each 7.5 mils thick.

As has been indicated above, the filamentary supporting wires 6 and 6' may be assembled with the cut strip either before or after the cutting operation is performed. In the embodiment of Figs. 1–5 the wires 6 and 6' are associated with the strip 1 before the cutting operation is performed. The upper wire 6 is fed over the upper surface of the strip 1 in advance of the cutter 18, either before or after the stripper plate 22, while the lower wire 6' is fed into the space between the lower surface of the strip 1 and the upper surface of the plate 2, both wires 6 and 6' being in proper lateral registration with the central uncut strip section. (The wires are not shown in FIG. 4 in order to simplify the illustration.) The wires 6 and 6' pass between the edge sections 28 and 48 and thereby remain uncut as the assembly passes through the apparatus. The embodiment of FIGS. 7 and 8 illustrates the cutting of the strips 1 without having the wires 6 and 6' then associated therewith. Either arrangement could be used with either embodiment, and the particular combination of arrangement and embodiment is simply a matter of choice and is not limiting.

Both the edge portion of the plate 22 and the cutting elements 52 are formed of some appropriate hard material such as tool steel. However, when, as is preferred, it is the plate 22 which functions as the cutting element, that part is preferably formed of harder material than the cutting elements 52 which function as anvils.

Figure 5:
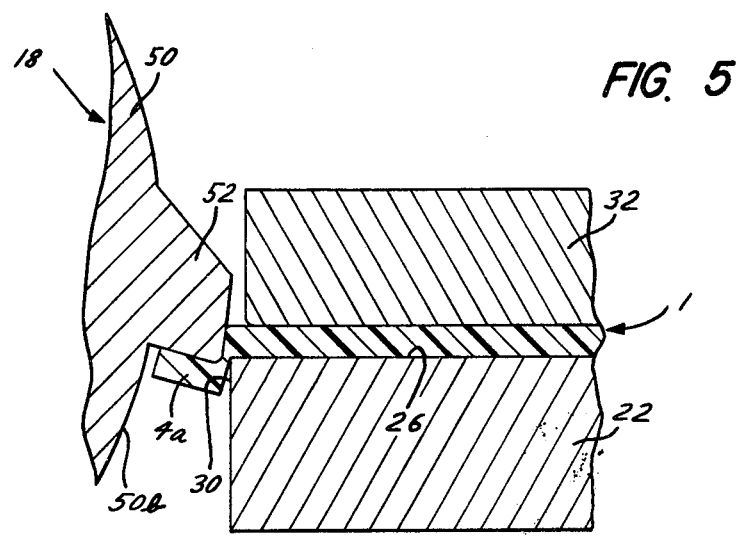
FIG. 5 is a cross sectional view on an enlarged scale taken along the line 5—5 of FIG. 2.
Figure 4:
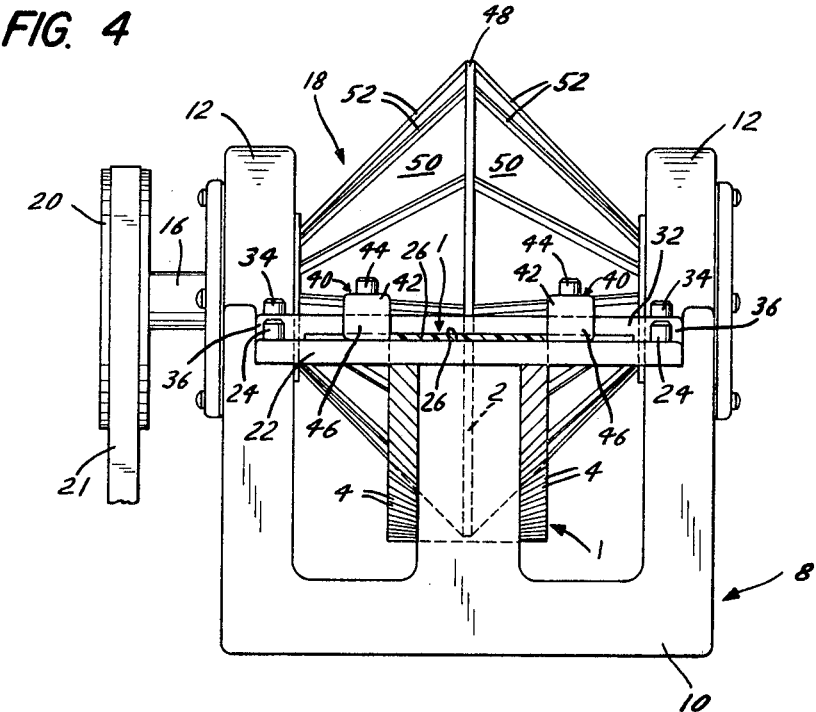
FIG. 4 is an end elevational view taken from the right hand end of FIG. 3.

The degree to which the cutting elements 52 extend radially out from the drum sections 50 constitutes a maximum limit on the thickness of the needles 4 which can be cut thereby because, as may be seen from FIG. 5, a proper cut will be produced only so long as the leading edge of the embryonic needle 4a there being cut does not reach the outer peripheral surface 50b of the drum section 50. The spacing between the cuts and hence the width of the needles 40 can be almost any amount less than the aforementioned maximum, depending upon the relative speed of movement of the cutter 18 and the strip 1, as described above.

From the above it will be apparent that the cutting device of the present invention is extremely simple and sturdy in construction, that its rate of productivity is exceptionally high, that the produced product is characterized by a high degree of accuracy and uniformity, that its flexiblity of use to produce end products having different dimensional characteristics is outstandingly good, and that maintenance of cutting sharpness is very readily and inexpensively effected, all in marked contrast to the more expensive and less effective cutting machines of the prior art.

While but a limited number of embodiments of the present invention have been here specifically disclosed, it will be apparent that many variations may be made therein, all within the scope of the present invention as defined in the following claims.

I claim:
1. A sheet cutting device comprising a body having a surface terminating in an edge, said edge comprising an intermediate section of given width and outer sections extending out relative to opposite ends of said intermediate section and making a given angle with one another, said sheet being adapted to move over said surface past said edge, a cutter rotatably mounted relative to said body and carrying a set of cutting members axially separated from one another to define a space substantially in registration with said intermediate section of said edge and angularly related to one another in a manner corresponding to said outer sections of said end edge, said cutter being located so that as it rotates said members are moved closely past said outer sections of said edge, and means for rotating said cutter, said members, as said cutter rotate, moving past said edge so as to cut said sheet between said members and said outer section of said edge but leave the sheet uncut in registration with said intermediate section of said edge.

2. The sheet cutting device of claim 1, in which said intermediate section of said edge is recessed relative to the adjacent ends of said outer sections of said edge.

3. The sheet cutting device of claim 2, in which said cutting members are skewed relative to the axis of rotation of said cutter.

4. The sheet cutting device of claim 2, in which said cutter carries, circumferentially spaced therearound, a plurality of said sets of cutting members.

5. The sheet cutting device of claim 2, in which said cutter carries, circumferentially spaced therearound, a plurality of said sets of cutting members, and in which said cutting members are skewed relative to the axis of rotation of said cutter.

6. The sheet cutting device of claim 2, in which said cutter carries, circumferentially spaced therearound, a plurality of said sets of cutting members, in which said cutting members are skewed relative to the axis of rotation of said cutter, and in which said edge of said body surface is sharp and defines a cutting edge, said cutter-carried members defining anvils cooperable with said cutting edge.

7. The sheet cutting device of claim 2, in which the outer surface of said cutter is radially recessed in the space between said members.

8. The sheet cutting device of claim 2, in which said edge of said body surface is sharp and defines a cutting edge, said cutter-carried members defining anvils cooperable with said cutting edge.

9. In the sheet cutting apparatus of claim 2, a part mounted on said body, extending over said surface adjacent said edge, and spaced upwardly from said surface by a predetermined distance, said sheet being adapted to be substantially snugly received between said part and said surface as it moves over the latter.

10. In the sheet cutting apparatus of claim 2, a part mounted on said body, extending over said surface adjacent said edge, and spaced upwardly from said surface by a predetermined distance, said sheet being adapted to be substantially snugly received between said part and said surface as it moves over the latter, and elements carried by one of said part and said body and vertically blocking the sides of the space between said part and said surface, thereby to define lateral guides for said sheet as it moves over said surface.

11. The sheet cutting device of claim 2, in which said edge defines a substantially concave configuration and said cutter members define a substantially mating convex configuration.

12. The sheet cutting device of claim 2, in which said edge defines a substantially convex configuration and said cutter members define a substantially mating concave configuration.

13. The sheet cutting device of claim 1, in which said cutting member are skewed relative to the axis of rotation of said cutter.

14. The sheet cutting device of claim 13, in which said cutter carries, circumferentially spaced therearound, a plurality of said sets of cutting members.

15. The sheet cutting device of claim 13, in which the outer surface of said cutter is radially recessed in the space between said members.

16. The sheet cutting device of claim 13, in which said edge of said body surface is sharp and defines a cutting edge, said cutter-carried members defining anvils cooperable with said cutting edge.

17. In the sheet cutting apparatus of claim 13, a part mounted on said body extending over said surface adjacent said edge, and spaced upwardly from said surface by a predetermined distance, said sheet being adapted to be substantially snugly received between said part and said surface as it moves over the latter.

18. In the sheet cutting apparatus of claim 13, a part mounted on said body, extending over said surface adjacent said edge, and spaced upwardly from said surface by a predetermined distance, said sheet being adapted to be substantially snugly received between said part and said surface as it moves over the latter, and elements carried by one of said part and said body and vertically blocking the sides of the space between said part and said surface, thereby to define lateral guides for said sheet as it moves over said surface.

19. The sheet cutting device of claim 13, in which said edge defines a substantially concave configuration and said cutter members define a substantially concave configuration.

20. The sheet cutting device of claim 13, in which said edge defines a substantially convex configuration and said cutter members define a substantially mating concave configuration.

21. The sheet cutting device of claim 1, in which said cutter carries, circumferentially spaced therearound, a plurality of said sets of cutting members.

22. The sheet cutting device of claim 1, in which said edge of said body surface is sharp and defines a cutting edge, said cutter-carried members defining anvils cooperable with said cutting edge.

23. In the sheet cutting apparatus of claim 1, a part mounted on said body, extending over said surface adjacent said edge, and spaced upwardly from said surface by a predetermined distance, said sheet being adapted to be substantially snugly received between said part and said surface as it moves over the latter.

24. In the sheet cutting device of claim 23, elements carried by one of said part and said body and vertically blocking the sides of the space between said part and said surface, thereby to define lateral guides for said sheet as it moves over said surface.

25. The sheet cutting device of claim 1, in which said edge defines a substantially concave configuration and said cutter members define a substantially mating convex configuration.

26. The sheet cutting device of claim 1, in which said edge defines a substantially convex configuration and said cutter members define a substantially mating concave configuration.

References Cited

UNITED STATES PATENTS

| | | | |
|---|---|---|---|
| 977,851 | 1910 | Busfield | 83—355 |
| 2,655,213 | 7/1953 | Anderson | 83—355 |
| 3,215,047 | 11/1965 | Braun | 93—1.5 |

ANDREW R. JUHASZ, Primary Examiner

JAMES F. COAN, Assistant Examiner

U.S. Cl. X.R.

83—449, 509; 93—1.5